US006195750B1

United States Patent
Ellsworth

(10) Patent No.: US 6,195,750 B1
(45) Date of Patent: Feb. 27, 2001

(54) METHOD AND APPARATUS FOR DYNAMIC CPU RECONFIGURATION IN A SYSTEM EMPLOYING LOGICAL PROCESSORS

(75) Inventor: Robert Scott Ellsworth, Fall City, WA (US)

(73) Assignee: Amdhal Corporation, Sunnyvale, CA (US)

(*) Notice: Subject to any disclaimer, the term of this patent is extended or adjusted under 35 U.S.C. 154(b) by 0 days.

(21) Appl. No.: 09/265,717

(22) Filed: Mar. 9, 1999

(51) Int. Cl.[7] ........................................ G06F 13/00
(52) U.S. Cl. ........................... 713/100; 709/221
(58) Field of Search .................... 712/30, 11, 23, 712/20, 37, 208; 711/173; 709/1; 713/191, 100

(56) References Cited

U.S. PATENT DOCUMENTS

| | | | |
|---|---|---|---|
| 5,530,753 | * 6/1996 | Easter et al. | 713/191 |
| 5,574,936 | * 11/1996 | Ryba et al. | 712/30 |
| 5,784,636 | * 7/1998 | Rupp | 712/37 |
| 5,784,701 | * 7/1998 | Greenstein et al. | 711/173 |
| 5,790,880 | * 8/1998 | Ireton | 712/23 |
| 5,819,061 | * 10/1998 | Glassen et al. | 709/1 |
| 5,832,291 | * 11/1998 | Rosen et al. | 712/11 |
| 5,903,771 | * 5/1999 | Sgro et al. | 712/20 |

* cited by examiner

*Primary Examiner*—Zarni Maung
*Assistant Examiner*—Jungwon Chang
(74) *Attorney, Agent, or Firm*—David E. Lovejoy

(57) ABSTRACT

A multiprocessor system having a plurality of CPUs that can be dynamically reconfigured between online and offline without system shutdown. The multiprocessor system includes a dynamic reconfiguration subsystem for reconfiguration without shutdown. The dynamic reconfiguration subsystem includes a service processor having a feature file for identifying a current online number corresponding to a current number of online CPUs, a current offline number corresponding to a current number of offline CPUs and an update number corresponding to changes to be made in the current online number and the current offline number. A reconfiguration control unit is provided for reconfiguring CPUs in the multiprocessor system without being shutdown that includes a store for storing configuration code in response to the feature file, a system state execution unit for executing the configuration code to form configuration control information and decoder means for decoding the control information to change the current number of online CPUs and the current number of offline CPUs by the update number.

3 Claims, 3 Drawing Sheets

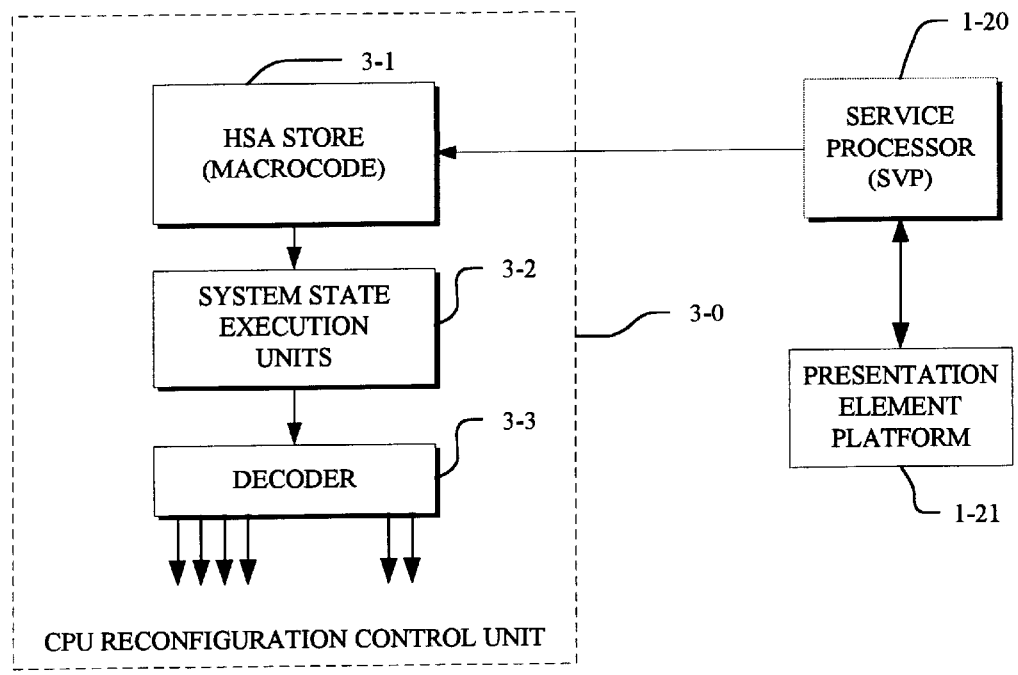

| LP01 | LP02 | LP03 | LP04 |
| LP05 | LP06 | LP07 | LP08 |
| LP09 | LP10 | LP11 | LP12 |
| LP13 | LP14 | LP15 | LP16 |

= SHARED
= DEDICATED
= OFF-LINE

| LP01 | LP02 | LP03 | LP04 |
| LP05 | LP06 | LP07 | LP08 |
| LP09 | LP10 | LP11 | LP12 |
| LP13 | LP14 | LP15 | LP16 |

= SHARED
= DEDICATED
= OFF-LINE

| LP01 | LP02 | LP03 | LP04 |
| LP05 | LP06 | LP07 | LP08 |
| LP09 | LP10 | LP11 | LP12 |
| LP13 | LP14 | LP15 | LP16 |

= SHARED
= DEDICATED
= OFF-LINE

METHOD AND APPARATUS FOR DYNAMIC CPU RECONFIGURATION IN A SYSTEM EMPLOYING LOGICAL PROCESSORS

BACKGROUND OF THE INVENTION

The present invention relates to the field of computers and more particularly to multiprocessor systems having CPUs that can be added or removed from system operation.

Computer users are concerned about availability of their computer systems and particularly upgrades and downgrades in the CPU configuration. A CPU upgrade is performed, among other reasons, to increase the capacity of the computer system and a CPU downgrade is performed to reduce the capacity of the system. Increasing or decreasing the capacity of a system, besides tailoring the system to fit the data processing needs of the user, also has a significant cost element since many software products that run on computer systems are priced as a function of the system capacity.

In large multiprocessor computer systems that employ multiple system control programs (SCPs), CPU upgrades have been difficult to schedule because the computer user must plan an outage for all of the SCPs running on the CPU to be upgraded. With the continued exploitation of logical partitioning using multiple domain features (MDF), it has become impractical to schedule all SCPs to be down at the same time. This difficulty causes customers to delay necessary upgrades rather than attempting to schedule the total system outage. The current upgrade process includes the following steps:

1) Establish a hardware upgrade price with the hardware vendor.
2) Notify the Operating System Vendor (for example, IBM for main frame systems) to change their software charges to account for the upgraded system capacity.
3) Notify Independent Software Vendors (ISVs) to change their software charges to account for the upgraded system capacity and providing the new CPUID version code when necessary.
4) Update ISV software encoded CPUID tables.
5) Take a system outage to implement the upgrade Steps 1–4 are normally performed days or even weeks before the outage is taken. While few software products actually check the CPUID version code for compliance, the customer is normally required by contract to notify both the Operating System vendor and any ISVs when their licensed software will be run on a different hardware configuration. The current practice often encounters delays that are wasteful to the computer user.

Accordingly, and in light of the problems of prior systems, there is a need to be able to upgrade computer CPU configurations dynamically without causing the computer user to suffer the delays and outages that have heretofore been required. It is desirable that users be able to purchase additional capacity quickly and with little effort.

SUMMARY OF THE INVENTION

The present invention is a multiprocessor system having a plurality of CPUs that can be dynamically reconfigured between online and offline without system shutdown. The multiprocessor system is operable in different modes, including a user mode for processing user programs and a system mode for processing system programs unavailable to users. Although the multiprocessor system is capable of being shutdown to terminate operation and permit reconfiguration during or after a shutdown, the multiprocessor system of the present invention includes a dynamic reconfiguration subsystem for reconfiguration without shutdown.

The dynamic reconfiguration subsystem includes a service processor having a feature file for identifying a current online number corresponding to a current number of online CPUs, a current offline number corresponding to a current number of offline CPUs and an update number corresponding to changes to be made in the current online number and the current offline number. A reconfiguration control unit is provided for reconfiguring CPUs in the multiprocessor system without being shutdown that includes a store for storing configuration code in response to the feature file, a system state execution unit for executing the configuration code to form configuration control information and decoder means for decoding the control information to change the current number of online CPUs and the current number of offline CPUs by the update number.

The present invention allows the definition of offline logical processors (LPs) which may be brought online when the reserved capacity is made available. The total number of domain LPs, including offline LPs, may not exceed the total number of physically installed CPUs. However, when the domain is activated, the number of online LPs per domain may not exceed the number of customer purchased non-ICS CPUs.

With the present invention, a user must still perform steps 1–4 above, as discussed in the background, but a system outage is not required. The steps performed are as follows:

1. Install new feature file on the SVP which defines the number of online CPUs.
2. Macrocode adjusts the number of online CPUs in the system to match the feature file.
3. Macrocode resets the fenced (Off-line) CPU.
4. Macrocode adds CPUs to the shared pool.
5. Macrocode dispatches work (domain/partition LPs) on the shared CPUs.
6. The LPCTL frame is used by the customer to change the number of dedicated LPs.
7. The customer can use the MVS command "CF CPU (nn), online".

The actual upgrade process is controlled to return the correct CPUID including version code to the SCP when it is retrieved with the Store CPUI) (STIDP) instruction.

During SCP initialization, a STIDP instruction is performed to retrieve the CPUID and save it in storage. IBM SCPs such as OS/390 use this storage location to establish a unique dynamic path array identifier, determine recovery actions, and establish future Service Call Logical Processor (SCLP) actions. ISV software products (in particular those products that check their encoded CPUID tables for compliance) issue their own STIDP when that ISV software is initialized.

The CPUID contains each vendor's model number (for example, Amdahl 700) as well as a version code which identifies a specific server (for example, x'58'=785). In the case of the Amdahl MGS 700, the X'5' indicates that the CPUs are running at full speed and the X'8' defines that eight physical CPUs are installed and available for customer use.

The foregoing and other objects, features and advantages of the invention will be apparent from the following detailed description in conjunction with the drawings.

BRIEF DESCRIPTION OF THE DRAWINGS

FIG. 3 depicts a CPU reconfiguration control unit within the multiprocessor system of FIG. 1 and FIG. 2.

FIG. 4 depicts the logical processor (LP) configuration of the FIG. 1 system.

FIG. 5 depicts the logical processor (LP) configuration of the FIG. 2 system.

DETAILED DESCRIPTION

Figure 1:
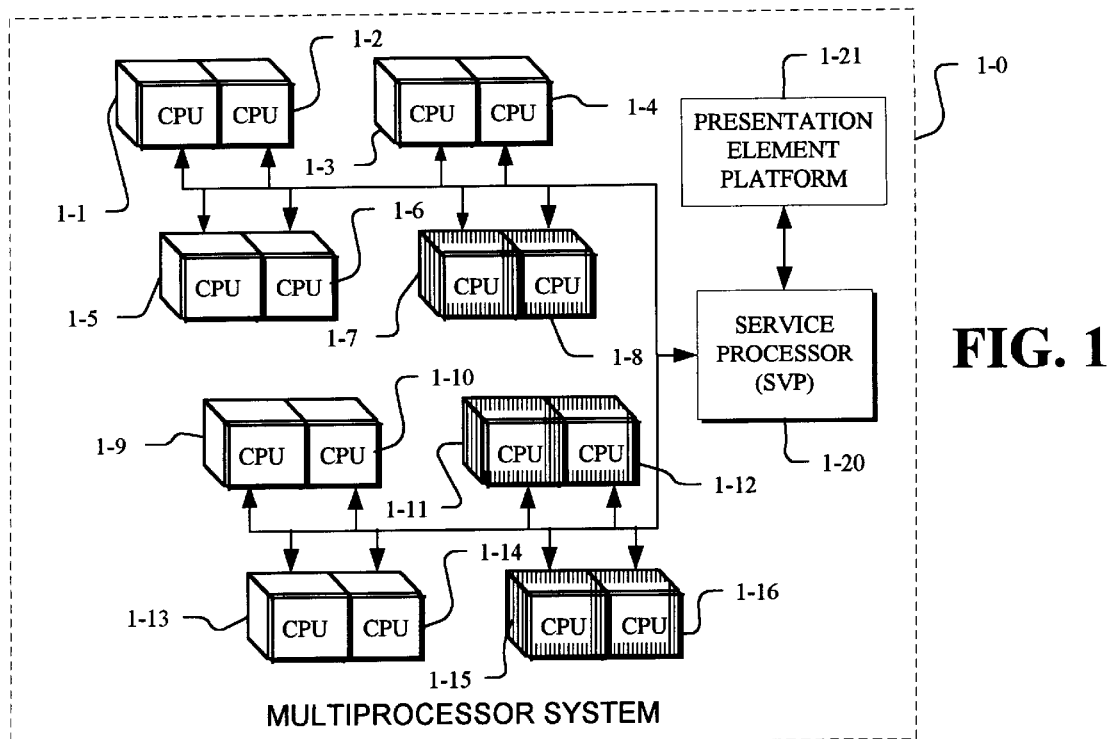
FIG. 1 depicts a multiprocessor system having a current CPU configuration.

Multiprocessor Systems—FIG. 1

In FIG. 1, a multiprocessor system 1-0 is shown, including a plurality of CPUs 1, specifically including CPUs 1-1, 1-2, ..., 1-16. The multiprocessor system 1-0 includes a Service Processor (SVP) 1-20 which controls the configuration and maintenance of the multiprocessor system 1-0. The multiprocessor system 1-0 also includes a Presentation Element Platform (PEP) 1-21 which provides a user interface to the service processor 1-20.

In the FIG. 1 example, ten of the sixteen CPUs are online, specifically CPUs 1-1, ..., 1-6, 1-9, 1-10, 1-13 and 1-14. The other CPUs, namely, 1-7, 1-8, 1-11, 1-12, 1-15 and 1-16 are off-line.

Typical multiprocessor CPU boards contain two CPUs so that the multiprocessor system can be physically populated with two, four, ..., sixteen CPUs. However, a customer may only wish to initially purchase a machine that contains, for example, four CPUs and purchase more at a later time. Later on the customer will be able to dynamically upgrade the purchased machine to the maximum number of CPUs that are physically installed.

Dynamic CPU Reconfiguration is the ability to increase or decrease the number of CPUs a customer has purchased and are physically available for use without requiring a system reset. This dynamic reconfiguration capability increases the availability of the multiprocessor system. With this ability, customers are able to purchase additional CPUs in a very short period of time without unwanted downtime.

Figure 2:
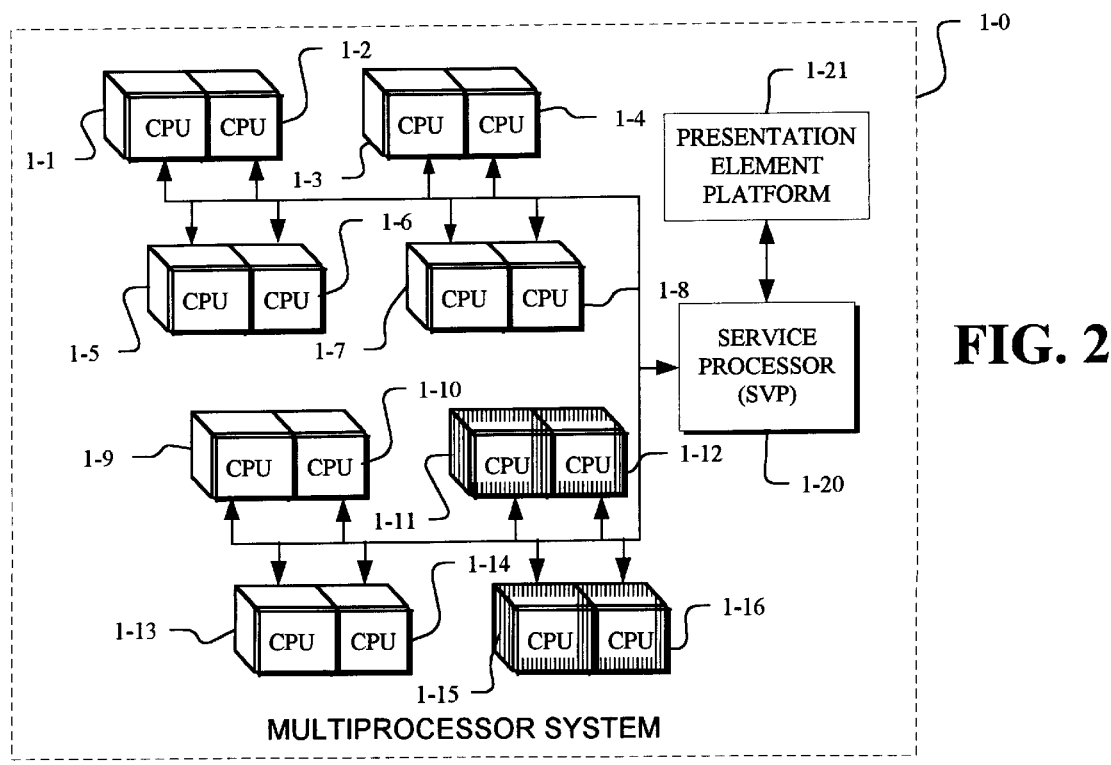
FIG. 2 depicts a multiprocessor system having a new CPU configuration.

Reconfigured Multiprocessor System—FIG. 2

In FIG. 2, the multiprocessor system 1-0 of FIG. 1 has been reconfigured to change the offline CPUs 1-7 and 1-8 of FIG. 1 to online in FIG. 2. The change of the configuration from FIG. 1 to the configuration of FIG. 2 occurs dynamically without necessity of shut-down of the multiprocessor system 1-0.

CPU Reconfiguration Control Unit—FIG. 3

In FIG. 3, the CPU reconfiguration control unit 3-0 operates in response to a feature file in the service processor 1-20 for dynamically reconfiguring the multiprocessor system 1-0. The feature file includes information identifying a current online number corresponding to the current number of online CPUs, a current offline number corresponding to a current number of offline CPUs and an update number corresponding to changes to be made in the current online number and the current offline number. In the FIG. 1 example, the number of online CPUs is ten and the number of offline CPUs is six. In changing from the FIG. 1 configuration to the FIG. 2 configuration, the update number is two. The update number adds two to the online number and subtracts two from the offline number.

While an increase in online CPUs and a decrease in off-line CPUs is contemplated going from the FIG. 1 configuration to the FIG. 2 configuration, the present invention works equally well in either direction. Namely, if the current configuration is that of FIG. 2 and the new configuration is that of FIG. 1, then the update number remains two, but the update number is subtracted from the online number and is added to the offline number.

Current Configuration—FIG. 4

Each of the 15 domains can have from 1 to 16 LPs. These LPs are dispatched on CPUs 1-1, ..., 1-16 of FIG. 1 and FIG. 2. Dedicated LPs are dispatched 100% of the time on a dedicated CPU while shared LPs of each domain are dispatched a portion of the time on a shared CPU. Each domain typically can have a separate system control programs SCPs which each control operation in a well-known manner with a view of the multiprocessor system which appears to be exclusive to the SCP. Since each SCP runs independently, it is difficult to control all of the SCPs such that they can be shut down simultaneously in order to shut down the entire multiprocessor system 1-0.

In FIG. 4, the state of each of the logical processors LP01, ..., LP16 is either SHARED, DEDICATED or OFF-LINE. FIG. 4 represents the state of FIG. 1 logical processors, by way of example, where the dedicated logical processors are LP01, ..., LP04. The shared logical processors of FIG. 1 are LP05, LP06, LP09, LP10, LP13 and LP14. The off-line logical processors in FIG. 1 are LP07, LP08, LP11, LP12, LP15, and LP16.

Figures 6, 7, 8:
FIG. 6 depicts a new logical processor (LP) upgrade configuration.
FIG. 7 depicts a new logical processor (LP) upgrade configuration with a new dedicated LP.
FIG. 8 depicts a new logical processor (LP) downgrade configuration.

New Upgrade Configurations—FIG. 5, FIG. 6 and FIG. 7

In FIG. 5, the new configuration of the domain logical processors executing on the CPU configuration of the FIG. 2 multiprocessor system is shown. In FIG. 5, the LP07 and LP08 logical processors have been moved from the off-line state of the FIG. 4 configuration for the FIG. 1 multiprocessor system to a shared configuration.

In FIG. 6, the logical processor LP05 is reconfigured relative to the FIG. 5 configuration to a DEDICATED status.

In FIG. 7, the logical processor LP16 is changed from the off-line status of FIG. 6 to a SHARED ONLINE STATUS.

Downgrade Configuration—FIG. 8 In FIG. 8, the logical processors LP09, LP10, LP13 and LP14 are moved from the online status as shown in the FIG. 5 configuration to an OFF-LINE configuration.

In FIG. 8, a total of eight logical processors are OFF-LINE and a total of eight logical processors are ON-LINE with LP01 and LP02 in the DEDICATED state with LPO1, ..., LP04, LP07 and LP08 in the SHARED state.

The total number of domain LPs, including offline LPs, may not exceed the total number of physically installed CPUs. However, when the domain is activated, the number of online LPs per domain may not exceed the number of customer purchased non-ICS CPUs.

Once a dynamic upgrade is requested and approved, a new feature file is created and downloaded by an authorized technician. This updated feature file is then installed concurrently on the server to be upgraded. After the upgrade of the feature file is complete, the additional CPU capacity is immediately placed in the shared CPU pool for non-specific domain CPU requests.

Existing shared LPs in currently running domains will then have access to the extra CPU capacity. Although their computed share will remain the same, the amount of shared CPU resource available to each domain and its LPs has increased which will result in more effective system capacity per domain.

If the number of existing LPs restricts consumption of the new CPU resource, those predefined offline LPs may be brought online via an SCP operator command such as an OS/390 "CF CPU(x),ONLINE" or VM/ESA "VARY ON PROC(x)". The new CPUs will then be used to satisfy the demand generated by these new online LPs. Additionally, the new CPU may be moved from the shared CPU pool to provide backing for a dedicated LP. If offline LPs were not defined in the activation profile, a domain reactivation is required. In this case, dynamic reorganization may be disruptive to that domain. Once a dynamic upgrade is completed, the activation profile should be updated to retain the new domain configuration.

If dynamic upgrade is used to dynamically increase capacity to handle a disaster, once the disaster is resolved the system may also be dynamically downgraded. The following steps may be used to perform a dynamic downgrade:

1) Deactivate the backup domains or configure LPs offline as required.
2) Dynamically downgrade the system by installing a new feature file.
3) Modify and save changed domain profiles.

Software asset management requires that the CPUID be accurate. When a Dynamic CPU Upgrade is performed, the CPUID, including the version code, is immediately updated to accurately return the current model. Until the domain is re-IPLed, there will be a mismatch between the CPUID saved in SCP storage during initialization and the CPUID returned by a STIDP.

Even with dynamic CPU reconfiguration, the user still has the responsibility of notifying all software vendors that an upgrade will take place. The Operating System vendor should be advisor that a dynamic upgrade will be performed so that they will better understand the environment in case a software problem does arise.

Detailed Dynamic CPU Reconfiguration Algorithm

The following steps present the algorithm for dynamic reconfiguration.

1. The customer may specify offline LPs when creating and activating domains. The total number of LPs should not exceed the total number of physically installed CPUs. The number of LPs may be less than the total number of physically installed CPUs. This operation requires changes to the profiles on the Presentation Element Platform (PEP). A new field is added to the profiles to hold the number of processors that are to be offline at activation time. The number of processors field holds the number of offline plus online processors. The number of processors is checked to ensure that it does not exceed the number of physically installed CPUs. A message is issued if the user exceeds this number. A field is added to the processor characteristics profile edit frame to show the number of purchased CPUS. The affect partition controls frame shows the number of LPs actually being used for active partitions and the number in the profile for inactive partitions.

A new field in the profiles holds the number of offline processors. Due to an incompatibility between the PEP and the Hardware Management Console (HMC), in order to change the profiles, a user uses Distributed Console Access Facility (DCAF) to get to the PEP screens instead of using the HMC screens directly. Without the number of offline field, for each partition, the total number of LPs (offline and online) would have to equal the number of physically installed CPUs. This relationship would create many offline LPs that are not necessary and would create a big problem for the scheduler because the scheduler would be required to look at all of these LPs all of the time. Such operation would also create a performance problem. Also, without the number of offline field, field domain operators can do a CF CPU online for any of these offline LPs. This operation could also create performance problems. It is better to allow the system operator to limit the number of offline LPs to the number that might actually be used at upgrade time.

With the addition of this new "number of offline processors" field, users modify their profiles after every upgrade or down-grade. Having this offline processors field is a feature users may use even if they aren't going to make use of dynamic reconfiguration. The profile contains a field for the number of dedicated processors. The user can specify that all LPs are dedicated even the offline ones. The scheduler assigns dedicated processors in first-come first-serve order. So, the LPs that are brought online first get the dedicated CPUs if the user has specified fewer dedicated than there are LPs in total.

2. Macrocode has control blocks available for the new CPUs that may be added for an upgrade. Macrocode will set up the number of control blocks for a partition at creation time based on the number of logical processors specified in the create partition Request/Response Control Block (RRCB). The create partition RRCB is changed for dynamic reconfiguration so that the total number of logical processors and the number of offline logical processors will be included. At activation time, Macrocode will only bring online the total number of logical processors minus the number of offline logical processors.

3. The field engineer puts the machine into Concurrent Maintenance (CM) mode so that dynamic installation of the features tape can be done.

4. From SVP, the field engineer installs a new features tape from the Generation Frame (GE) using the new dynamic reconfiguration option. This new features tape specifies the number of CPUs that are purchased whether it's more or less than before. The SVP decodes the new features tape and checks it. If there are some differences above and beyond the change in number of CPUs, then it is rejected. Also, if there is no change in the number of CPUs, a warning will be issued but the user can continue if desired.

5. To ensure that the customer has stopped use of the CPUs that are no longer purchased whenever features are being down-graded, the SVP will issue an High Level Command (HLC) to the PEP querying whether there will be enough CPUs left after the down-grade to prevent running degraded based on the current LP needs. The PEP will in turn need to query Macrocode. Note, that this needs to be a two HLC handshake. The first HLC queries the Macrocode. The response to this HLC is sent back immediately from the PEP. Then, the PEP queries macrocode for the information. Then, the PEP sends the information back in a second HLC. This sequence is necessary in order to prevent timing out on the first HLC while waiting for Macrocode to respond. If the FE chooses to continue with a downgrade after being warned about a mismatch in the number of LPs and CPUs, then the machine may run degraded. For performance reasons, the customer should reduce the maximum number of shared domain LPs to the number of shared physical processors. Since multiple shared LPs can run on fewer shared CPUs, this is not mandatory, but it is suggested.

6. From the SVP, the FE activates the new features without having to do an Initial Microcode Program Load (IMPL) of the system. The SVP updates the features control data on the hard drive and in memory and sets new CPUIDs into the HSA table. CPUFIRM uses the new CPUID from the next Store CPUID. A detailed log containing machine configuration information is retained. Service Tools need this information just like they do at IMPL time.

7. The dynamic reconfiguration feature activation causes a new HLC to be broadcast to the PEPs specifying that the number of purchased CPUs has changed.

8. The PEP syncs itself with the SVP. It updates all of it's information on how many CPUs are installed and purchased. It logs a message in the event log to track the fact that the number of purchased CPUs has changed.

9. The PEP sends Macrocode a new RRCB telling Macrocode that the number of purchased CPUs has changed. The PEP also sends this RRCB to Macrocode whenever the SVP is IPLed just in case an IPL has caused this message to be lost.

10. Macrocode issues a diagnose command to the SVP to obtain the maximum number of CPUs allowed by feature control data. Macrocode also issues this diagnose whenever the primary PEP has switched. This will cover the case where the message to Macrocode may have been lost due to a primary PEP switch. Macrocode retains this data in a secure manner.

11. Macrocode will only schedule CPUs that are within the maximum number allowed by feature control data. The 'extra' CPUs are put in 'spare' state so that they can be used for dynamic CPU reconfiguration (DCR).

12. Typically, all of the physically installed CPUs are reset at reset power on of the system so there is nothing needed to get any newly purchased CPUs reset.

13. Macrocode schedules work on the new CPUs if there are LPs already available to use them in the case of an upgrade. In the case of a down-grade, Macrocode stops use of the CPUs that are no longer purchased. This operation may cause the machine to run degraded if there aren't enough CPUs for all of the LPs that need them. The Macrocode scheduler will do LP-squeeze. Also, a degradation machine check will be generated which MVS logs.

14. Macrocode issues an RRCB to all PEPs indicating that a DCU/DCR operation took place. This RRCB has the new mapping table for Extended Virtual Machine (EVM) to System CPU addresses.

15. Macrocode sends RRCB(s) to all of the PEPs to indicate that the operator MAY vary the new CPU online to a partition if it is an upgrade and the partition has offline LPs that could be brought online. Since LPs can float across shared CPUs, there may be no need to bring any more LPs online. The PEP will receive as many RRCBs as there are partitions with LPs to be brought online. The PEP will issue a pop-up messages to the user and issue log messages.

16. Macrocode sends an RRCB to all of the PEPs indicating that the machine is running degraded if this has happened due to the down-grade. The PEP will issue a pop-up message to the user and log a message. There needs to be an indication in the RRCB as to whether this is serious and involves dedicated processors that aren't getting a full CPU (for example, 6 dedicated LPs from the same partition sharing 4 CPUs) or not so serious (for example, 6 LPs from the same partition sharing 4 CPUs without any being dedicated).

17. For an upgrade, if so prompted and it is necessary, an operator issues a CF CPU (x) online from MVS, causing an SCLP CF CPU to be sent to Macrocode. Macrocode starts scheduling more LPs on the physical CPUs. If the user has specified that the new LPs should be dedicated and there are enough CPUs to go around, the LPs will be made dedicated. The SCLP CF CPU may fail if there aren't enough CPUs to go around.

18. The customer may wish to change the number of offline processors in the profiles so that the desired number are brought online when the partition is re-activated. If the user doesn't change the profiles, the next partition activation may fail.

19. The customer may wish to change the number of dedicated CPUs for a given partition using the affect partition controls frame. It should be noted that the CPUID is only stored in the LPB at domain activation and should always reflect the current version of the system. The LPB CPUID should not change for an already activated domain.

EXAMPLES

Based on a multi-processor system that has six physically installed CPUs.

Example 1

1. User specifies 1 partition with 6 processors, 2 offline, 4 dedicated in the profile.
Purchased=4.

Editing the profile causes No warning message.

Partition activation causes a create partition ITRCB to be sent to Macrocode. 6 processors, 2 offline, 4 dedicated are specified.

Macrocode receives the RRCB. Macrocode will put 4 LPs online and 2 offline.

The user may upgrade the machine to 6 CPUs.

Upon doing so, still only 4 CPUs are being used until a CF CPU ON command is given from MVS. This causes an SCLP CF CPU to be sent to Macrocode. At that time, the newly on-lined LP's start to be scheduled.

The user can do an affect partition control to change the number of dedicated CPUs if desired.

If the user reactivates the partition, 4 LPs will be put online and 2 offline. The user can and should edit the profile so that 6 LPs will be brought online automatically.

The user can now down-grade the machine back to 4 CPUs.

If that is done, and no LPs were taken offline using the CF CPU OFF command from MVS, then a warning will be issued at feature installation time, warning the user that the machine will run degraded if he/she continues.

Macrocode will put two of the CPUs to sleep.

The Macrocode scheduler will do LP-squeeze. Also, a degradation machine check will be generated which MVS probably just logs.

Example 2

2. User specifies 1 partition with 4 processors, 0 offline, 4 dedicated in the profile, purchased=4.

Editing the profile to say 4 processors causes NO warning message.

Partition activation causes a create partition RRCB to be sent to Macrocode. 4 processors, 4 dedicated, 0 offline are specified.

Macrocode receives the RRCB. You'll end up with 4 online LPs, 0 offline.

The user may upgrade the machine to 6 CPUs.

Upon doing so, still only 4 CPUs will be used. The user hasn't specified extra LPs to run on the new CPUs so he can't make use of the new CPU power.

If the user reactivates the partition, only 4 LPs will be put online since this is the number in the profile.

The user could activate another partition to make use of the extra CPUs.

Example 3

3. The user specifies 1 partition, 6 processors, 2 offline, 0 dedicated in the profile. Purchased=4.

Partition activation causes a create partition RRCB to be sent to Macrocode. 6 processors, 2 offline, 0 dedicated are specified.

Macrocode receives the RRCB. Macrocode will put 4 LPs online and 2 offline.

The user may upgrade the machine to 6 CPUs.

Upon doing so, still only 4 CPUs are being used (an LP can use at most 100% of a CPU) until a CF CPU ON command is given from MVS. This causes an SCLP CF CPU to be sent to Macrocode. At that time, the newly on-lined LPs start to be scheduled.

The user can do an affect partition control to change the number of dedicated CPUs if desired.

If the user reactivates the partition, 4 LPs will be put online unless the user edits the profile to say that their are 0 offline.

The user can now down-grade the machine back to 4 CPUs.

If that is done, and no LPs were taken offline using the CF CPU OFF command from MVS, then a warning will be issued. This warning will be a gentle warning because there are enough CPUs for the LPs to share although each LP will be getting less than 100% of a CPU.

Macrocode will put two of the CPUs to sleep.

The 6 LPs will be online sharing 4 CPUs.

Example 4

4. The user specifies 2 partitions, purchased=4.
Part 1: 4 processors, 0 offline, 0 dedicated in the profile Part 2: 4 processors, 2 offline, 2 dedicated in the profile Partition activation for Part 1 causes a create partition RRCB to be sent to Macrocode. 4 processors, 0 offline, 0 dedicated are specified.

Macrocode receives the RRCB. Macrocode will put 4 LPs online.

Partition activation for Part 2 causes a create partition RRCB to be sent to Macrocode. 4 processors, 2 offline, 2 dedicated are specified.

Macrocode receives the RRCB. Macrocode will put 2 more LPs online and 2 LPs offline. There are a total of 6 LPs online and 2 LPs offline now and there are 4 CPUs available. Two of the LPs have dedicated CPUs and the rest are sharing the other two CPUs.

The user may upgrade the machine to 6 CPUs.

Upon doing so, all 6 CPUs are being used. A CF CPU ON command is not necessary since there are enough LPs already online to make use of the new CPUs. However the user could do a CF CPU ON for the two offline LPs if desired. It will just add to the number of LPs sharing the CPUs.

The user can do an affect partition control to change the number of dedicated CPUs if desired.

If the user reactivates the partitions, 6 LPs will be put online and 2 LPs will be offline. The user should edit the profile if he/she doesn't want any offline LPs.

The user can now down-grade the machine back to 4 CPUs.

If that is done, and no LPs were taken offline using the CF CPU OFF command from MVS, then a warning will be issued. This warning will be a gentle warning because there are enough CPUs for the LPs to share although each LP will be getting less than 100% of a CPU.

Macrocode will put two of the CPUs to sleep.

The 6 LPs will be online. 4 of the LPs will be sharing 2 CPUs and 2 LPs will have dedicated CPUs.

While the invention has been particularly shown and described with reference to preferred embodiments thereof it will be understood by those skilled in the art that the foregoing and other changes in form and details may be made therein without departing from the scope of the invention.

What is claimed is:

1. A multiprocessor system having a plurality of CPUs operable in different modes, including a user mode for processing user programs and a system mode for processing system programs unavailable to users, and capable of being shutdown to terminate operation, said multiprocessor system having a dynamic reconfiguration subsystem comprising:

a service processor having a feature file for identifying a current online number corresponding to a current number of online CPUs, a current offline number corresponding to a current number of offline CPUs and an update number corresponding to changes to be made in the current online number and the current offline number, a reconfiguration control unit for reconfiguring CPUs in the multiprocessor system without being shutdown including, store means for storing code in response to the feature file based upon said current online number, said current offline number and said update number, system state execution means for executing the code to form configuration control information, decoder means for decoding the control information to change the current number of online CPUs and the current number of offline CPUs by the update number.

2. The multiprocessor system of claim 1 wherein said reconfiguration control unit operates for reconfiguring CPUs as an upgrade to add to the current number of online CPUs.

3. The system of claim 1 wherein said reconfiguration control unit operates for reconfiguring CPUs as a downgrade to subtract from the current number of online CPUs.

* * * * *